(12) United States Patent
Tinianov et al.

(10) Patent No.: US 9,387,649 B2
(45) Date of Patent: *Jul. 12, 2016

(54) METHODS OF MANUFACTURING ACOUSTICAL SOUND PROOFING MATERIALS WITH OPTIMIZED FRACTURE CHARACTERISTICS

(75) Inventors: Brandon D. Tinianov, Santa Clara, CA (US); Kevin J. Surace, Sunnyvale, CA (US); Albert C. Yanez, Tracy, CA (US)

(73) Assignee: Pacific Coast Building Products, Inc., Rancho Cordova, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 13/028,088

(22) Filed: Feb. 15, 2011

(65) Prior Publication Data

US 2011/0165429 A1    Jul. 7, 2011

Related U.S. Application Data

(63) Continuation-in-part of application No. 12/117,687, filed on May 8, 2008, now Pat. No. 7,908,818, and a continuation-in-part of application No. 11/770,476, filed on Jun. 28, 2007, now abandoned.

(51) Int. Cl.
*B32B 7/14* (2006.01)
*B32B 7/12* (2006.01)
(Continued)

(52) U.S. Cl.
CPC ... *B32B 7/12* (2013.01); *B32B 7/14* (2013.01); *B32B 13/04* (2013.01); *B32B 13/08* (2013.01); *B32B 13/14* (2013.01); *B32B 37/12* (2013.01); *E04C 2/043* (2013.01); *B32B 37/1292* (2013.01);
(Continued)

(58) Field of Classification Search
CPC .......... B32B 7/14; B32B 13/04; B32B 13/08; B32B 13/14
USPC ........................ 156/289, 325; 181/285, 290
See application file for complete search history.

(56) References Cited

U.S. PATENT DOCUMENTS 2,590,013 A * 3/1952 Huntzicker ............... D21J 1/00
                                                    156/44
2,811,906 A    11/1957 Chappell
(Continued)

FOREIGN PATENT DOCUMENTS

CA    2219785 A1    10/1996
CN    1358684 A     7/2002
(Continued)

OTHER PUBLICATIONS

English Language Abstract, JP Patent First Publication No. 09-203153, Aug. 5, 1997, (2 pages).
(Continued)

*Primary Examiner* — Timothy Kennedy
(74) *Attorney, Agent, or Firm* — Locke Lord LLP (57) ABSTRACT

Laminated structures for use in building construction are fabricated by a manufacturing process such that the laminating steps to not require elevated drying temperatures or an extended dwell time at any point. The process employs stock materials that simultaneously reduce cost and improve performance. This is accomplished using a specially formulated viscoelastic glue and ambient temperature drying apparatus. As a result, the production capacity of the manufacturing facility, cost of goods, and delivered performance are greatly improved over existing methods.

20 Claims, 8 Drawing Sheets

(51) Int. Cl.
  *B32B 13/04* (2006.01)
  *B32B 13/08* (2006.01)
  *B32B 13/14* (2006.01)
  *B32B 37/12* (2006.01)
  *E04C 2/04* (2006.01)
  *B32B 38/16* (2006.01)

(52) U.S. Cl.
  CPC ....... *B32B 2038/166* (2013.01); *B32B 2250/40* (2013.01); *B32B 2307/102* (2013.01); *B32B 2315/18* (2013.01); *B32B 2419/00* (2013.01); *B32B 2471/00* (2013.01); *B32B 2607/00* (2013.01); *Y10T 156/10* (2015.01); *Y10T 428/31935* (2015.04)

(56) References Cited

U.S. PATENT DOCUMENTS

| | | |
|---|---|---|
| 3,092,250 A | 6/1963 | Knutson et al. |
| 3,106,503 A | 10/1963 | Randall et al. |
| 3,160,549 A | 12/1964 | Caldwell et al. |
| 3,215,225 A | 11/1965 | Kirschner |
| 3,336,710 A | 8/1967 | Raynes |
| 3,399,104 A | 8/1968 | Ball, III et al. |
| 3,424,270 A | 1/1969 | Hartman et al. |
| 3,462,899 A | 8/1969 | Sherman |
| 3,468,750 A | 9/1969 | Pfeifer et al. |
| 3,513,009 A | 5/1970 | Austin et al. |
| 3,579,941 A | 5/1971 | Tibbals |
| 3,642,511 A | 2/1972 | Cohn et al. |
| 3,728,209 A | 4/1973 | Sugaike et al. |
| 3,828,504 A | 8/1974 | Egerborg et al. |
| 3,879,248 A | 4/1975 | Kest |
| 3,960,580 A | 6/1976 | Stierli et al. |
| 4,003,752 A | 1/1977 | Isohata et al. |
| 4,112,176 A | 9/1978 | Bailey |
| 4,117,197 A | 9/1978 | Krejci et al. |
| 4,134,956 A | 1/1979 | Suzuki et al. |
| 4,156,615 A | 5/1979 | Cukier |
| 4,174,229 A | 11/1979 | Boberski et al. |
| 4,311,767 A | 1/1982 | Kennedy |
| 4,347,912 A | 9/1982 | Flocke et al. |
| 4,364,017 A | 12/1982 | Tokunaga et al. |
| 4,375,516 A | 3/1983 | Barrall |
| 4,474,840 A | 10/1984 | Adams |
| 4,487,793 A | 12/1984 | Haines, Jr. et al. |
| 4,488,619 A | 12/1984 | O'Neill |
| 4,557,970 A | 12/1985 | Holtrop et al. |
| 4,618,370 A | 10/1986 | Green et al. |
| 4,642,951 A | 2/1987 | Mortimer |
| 4,663,224 A | 5/1987 | Tabata et al. |
| 4,678,515 A | 7/1987 | Green et al. |
| 4,685,259 A | 8/1987 | Eberhart et al. |
| 4,759,164 A | 7/1988 | Abendroth et al. |
| 4,778,028 A | 10/1988 | Staley |
| 4,786,543 A | 11/1988 | Ferm |
| 4,924,969 A | 5/1990 | K'Heureux |
| 4,956,321 A | 9/1990 | Barrall |
| 4,967,530 A | 11/1990 | Clunn |
| 5,016,413 A | 5/1991 | Counihan |
| 5,026,593 A | 6/1991 | O'Brien |
| 5,033,247 A | 7/1991 | Clunn |
| 5,063,098 A | 11/1991 | Niwa et al. |
| 5,110,660 A | 5/1992 | Wolf et al. |
| 5,125,475 A | 6/1992 | Ducharme et al. |
| 5,158,612 A | 10/1992 | Savoly et al. |
| 5,183,863 A * | 2/1993 | Nakamura et al. ............ 525/438 |
| 5,240,639 A | 8/1993 | Diez et al. |
| 5,256,223 A | 10/1993 | Alberts et al. |
| 5,258,585 A | 11/1993 | Juriga |
| 5,304,415 A | 4/1994 | Kurihara et al. |
| 5,334,806 A | 8/1994 | Avery |
| 5,342,465 A | 8/1994 | Bronowicki et al. |
| 5,368,914 A | 11/1994 | Barrett |
| 5,439,735 A | 8/1995 | Jamison |
| 5,473,122 A | 12/1995 | Kodiyalam et al. |
| 5,474,840 A | 12/1995 | Landin |
| 5,502,931 A | 4/1996 | Munir |
| 5,535,920 A | 7/1996 | Blair, Jr. et al. |
| 5,585,178 A | 12/1996 | Calhoun et al. |
| 5,603,192 A | 2/1997 | Dickson |
| 5,629,503 A | 5/1997 | Thomasen |
| 5,643,666 A | 7/1997 | Eckart et al. |
| 5,644,880 A | 7/1997 | Lehnert et al. |
| 5,664,397 A | 9/1997 | Holz |
| 5,674,338 A | 10/1997 | Parker et al. |
| 5,691,037 A | 11/1997 | McCutcheon et al. |
| 5,695,867 A | 12/1997 | Saitoh et al. |
| 5,768,841 A | 6/1998 | Swartz et al. |
| 5,824,973 A | 10/1998 | Haines et al. |
| 5,867,957 A | 2/1999 | Holtrop |
| 5,910,082 A | 6/1999 | Bender et al. |
| 5,918,437 A | 7/1999 | Dobija |
| 5,945,208 A | 8/1999 | Richards et al. |
| 5,945,643 A | 8/1999 | Casser |
| 5,954,497 A | 9/1999 | Cloud et al. |
| 6,066,688 A * | 5/2000 | Samonides, Sr. ...... C09J 133/08 524/270 |
| 6,077,613 A | 6/2000 | Gaffigan |
| 6,123,171 A | 9/2000 | McNett et al. |
| 6,133,172 A | 10/2000 | Sevenish et al. |
| 6,213,252 B1 | 4/2001 | Ducharme |
| 6,238,594 B1 | 5/2001 | Turpin et al. |
| 6,240,704 B1 | 6/2001 | Porter |
| 6,266,427 B1 | 7/2001 | Mathur |
| 6,286,280 B1 | 9/2001 | Fahmy et al. |
| 6,290,021 B1 | 9/2001 | Strandgaard |
| 6,309,985 B1 | 10/2001 | Virnelson et al. |
| 6,342,284 B1 | 1/2002 | Yu et al. |
| 6,381,196 B1 | 4/2002 | Hein et al. |
| 6,389,771 B1 | 5/2002 | Moller |
| 6,391,958 B1 | 5/2002 | Luongo |
| 6,443,256 B1 | 9/2002 | Baig |
| 6,443,257 B1 | 9/2002 | Wiker et al. |
| 6,632,550 B1 | 10/2003 | Yu |
| 6,672,426 B2 | 1/2004 | Kakimoto et al. |
| 6,676,744 B2 | 1/2004 | Merkley et al. |
| 6,699,426 B1 | 3/2004 | Burke |
| 6,715,241 B2 | 4/2004 | Gelin et al. |
| 6,747,074 B1 | 6/2004 | Buckingham et al. |
| 6,758,305 B2 | 7/2004 | Gelin et al. |
| 6,790,520 B1 | 9/2004 | Todd et al. |
| 6,800,161 B2 | 10/2004 | Takigawa et al. |
| 6,803,110 B2 | 10/2004 | Drees et al. |
| 6,815,049 B2 | 11/2004 | Veeramasuneni et al. |
| 6,822,033 B2 | 11/2004 | Yu et al. |
| 6,825,137 B2 | 11/2004 | Fu et al. |
| 6,877,585 B2 | 4/2005 | Tinianov |
| 6,913,667 B2 | 7/2005 | Nudo et al. |
| 6,920,723 B2 | 7/2005 | Downey |
| 6,941,720 B2 | 9/2005 | DeFord et al. |
| 7,041,377 B2 | 5/2006 | Miura et al. |
| 7,068,033 B2 | 6/2006 | Sellers et al. |
| 7,181,891 B2 | 2/2007 | Surace et al. |
| 7,197,855 B2 | 4/2007 | Della Pepa |
| 7,254,894 B1 | 8/2007 | Halpert |
| 7,255,907 B2 | 8/2007 | Feigin et al. |
| 7,745,005 B2 | 6/2010 | Tinianov |
| 7,883,763 B2 | 2/2011 | Tinianov |
| 2002/0009622 A1 | 1/2002 | Goodson |
| 2003/0006090 A1 | 1/2003 | Reed |
| 2003/0070367 A1 | 4/2003 | Gelin et al. |
| 2003/0188826 A1 | 10/2003 | Miller |
| 2004/0005484 A1 | 1/2004 | Veeramasuneni et al. |
| 2004/0016184 A1 | 1/2004 | Huebsch et al. |
| 2004/0168853 A1 | 9/2004 | Gunasekera et al. |
| 2004/0213973 A1 | 10/2004 | Hara et al. |
| 2004/0214008 A1 | 10/2004 | Dobrusky et al. |
| 2005/0050846 A1 | 3/2005 | Surace et al. |
| 2005/0080193 A1 | 4/2005 | Wouters et al. |
| 2005/0103568 A1 | 5/2005 | Sapoval et al. |
| 2005/0130541 A1 | 6/2005 | Shah |
| 2005/0136276 A1 | 6/2005 | Borup et al. |
| 2005/0263925 A1 | 12/2005 | Heseltine et al. |

(56) References Cited

U.S. PATENT DOCUMENTS

| | | | |
|---|---|---|---|
| 2006/0048682 | A1 | 3/2006 | Wagh et al. |
| 2006/0057345 | A1 | 3/2006 | Surace et al. |
| 2006/0059806 | A1 | 3/2006 | Gosling et al. |
| 2006/0108175 | A1 | 5/2006 | Surace et al. |
| 2007/0094950 | A1 | 5/2007 | Surace et al. |
| 2007/0102237 | A1 | 5/2007 | Baig |
| 2007/0107350 | A1 | 5/2007 | Surace et al. |
| 2007/0175173 | A1 | 8/2007 | Babineau et al. |
| 2008/0264721 | A1 | 10/2008 | Tinianov |
| 2009/0000866 | A1 | 1/2009 | Tinianov |
| 2009/0107059 | A1 | 4/2009 | Kipp et al. |
| 2009/0239429 | A1 | 9/2009 | Kipp et al. |
| 2009/0280356 | A1 | 11/2009 | Tinianov et al. |
| 2010/0047461 | A1 | 2/2010 | Colbert |
| 2010/0116405 | A1 | 5/2010 | Kipp et al. |

FOREIGN PATENT DOCUMENTS

| | | |
|---|---|---|
| CN | 1894474 A | 1/2007 |
| EP | 1154087 B1 | 11/2001 |
| EP | 1485551 | 10/2005 |
| EP | 2267844 | 12/2010 |
| JP | 61-277741 | 12/1986 |
| JP | 63-060747 | 3/1988 |
| JP | 09-203153 A | 8/1997 |
| JP | 2010-046701 | 2/1998 |
| JP | 2004-042557 | 6/2002 |
| JP | 2002-266451 | 9/2002 |
| JP | 2003-221496 | 8/2003 |
| WO | WO 93/21402 | 10/1993 |
| WO | 96/34261 A1 | 10/1996 |
| WO | 97/19033 A1 | 5/1997 |
| WO | 00/24690 A1 | 5/2000 |
| WO | WO 00/50707 | 8/2000 |

OTHER PUBLICATIONS

*A Study of Techniques to Increase the Sound of Insulation of Building Elements,* Wyle Laboratories, Prepared for Dept. of Housing and Urban Development, Jun. 1973 (16 pages).
*Field Sound Insulation Evaluation of Load-Beating Sandwich Panels for Housing,* Final Report, Prepared by Robert E. Jones, Forest Products Laboratory, Forest Service, U.S. Department of Agriculture, Aug. 1975 (53 pages).
*Sound Studio Construction on a Budget,* F. Alton Everest, McGraw-Hill, 1997 (7 pages).
*Wood Handbook/Wood as an Engineering Material,* United States Department of Agriculture, Forest Service, General Technical Report FPL-GTR-113, Mar. 1999 (24 pages).
*Transmission Loss of Plasterboard Walls* by T.D. Northwood, Building Research Note, Division of Building Research, National Research Counsel, Ottawa, Canada, Jan. 19, 1970 (10 pages).
*A Guide to Airborne, Impact, and Structureborne Noise Control in Multifamily Dwellings,* U.S. Department of Housing and Urban Development, Prepared for the National Bureau of Standards, Washington, D.C., Jan. 1963 (5 pages).
*Transmission Loss of Leaded Building Materials,* Paul B. Ostergaard, Richmond L. Cardinell, and Lewis S. Goodfriend, The Journal of the Acoustical Society of America, vol. 35, No. 6, Jun. 1963 (7 pages).
*Dictionary of Architecture & Construction 2200 illustrations,* Third Edition, Edited by Cyril M. Harris, Professor Emeritus of Architecture Columbia University, McGraw-Hill, 2000 (7 pages).
*Dictionary of Engineering Materials,* Harald Keller, Uwe Erb, Wiley-Interscience by John Wiley & Sons, Inc. 2004 (4 pages).
*Chamber Science and Technology Dictionary,* by Professor Peter M.B. Walker, W & R Chambers Ltd and Cambridge University Press, 1988 (3 pages).
Noise and Vibration Control Engineering: *Principles and Applications,* Edited by Leo Beranek and Instvan Ver, Chapter 11, John Wiley & Sons, Inc., 1992, (12 pages).

Handbook of *Acoustical Measurements and Noise Control,* Edited by Cyril Harris, Chapter 32; Structureborne Sound Isolation, Chapter 33; Noise Control in Buildings, McGraw-Hill, Inc., 1991, (36 pages).
"Green Glue is your soundproofing solution and noise reduction material", www.greengluecompany.com (2 pages), retrieved on Nov. 9, 2006.
Acoustical: *A Sound Approach to Testing,* www.archest.com/pages, 2000 (2 pages).
STC—*Sound Transmission Class—Discussion and Use,* www.sota.ca/stc_info.htm, Aug. 13, 2003 (3 pages).
ASTM International, Designation: C 1396/C 1396M-04, *Standard Specification for Gypsum Board* (7 pages), 2004.
Barbara C. Lippiatt, National Institute of Standards and Technology. BEES 3.0, "*Building for Environmental and Economic Sustainability* Technical Manual and User Guide", Oct. 2002, (198 pages).
Takada, et al., *Effect in Reducing Floor Impact Noise of Recycled Paper Damper Members,* Bulletin of Tokyo Metropolitan Industrial Technology Research Institute, No. 2 (1999) [certified English translation] (13 pages).
*Architectural Acoustics,* M. David Egan, J. Ross Publishing (Reprint 2007) p. 211; originally published McGraw-Hill, 1988 (5 pages).
Hastings, Mardi C.; Godfrey, Richard; Babcock, G. Madison, *Application of Small Panel Damping Measurements to Larger Walls,* Proc. SPIE vol. 2720, p. 70-76, Smart Structures and Materials 1996: Passive Damping and Isolation (7 pages).
van Vuure, A.W.; Verpoest, I., Ko, F.K., *Sandwich-Fabric Panels as Spacers in a Constrained Layer Structural Damping Application,* Composites Part B 32 (2001) 11-19, Elsevier Science Ltd. (9 pages).
Noise and Vibration Control, Revised Edition, pp. 306-315, Institute of Noise Control Engineering, 1988, Beranek, Leo L. (editor) (9 pages).
Noise and Vibration Control, Chapter Fourteen, *Damping of Panels,* Ungar, Eric E., pp. 434-473, McGraw-Hill, 1971, Beranek, Leo L. (editor) (7 pages).
Nashif, Ahid D.; Jones, David I. G.; Henderson, John P., *Vibration Damping,* pp. 290-305, John Wiley & Sons, 1985 (18 pages).
Architectural Acoustics, Principles and Practice, John Wiley & sons, 1992, Cavanaugh, William J. and Wilkes, Joseph A. (editors) (332 pages).
FIRE Resistance Design Manual, Sound Control, Gypsum Association, GA-600-94 (14$^{th}$ Ed.) (107 pages), 1994.
FIRE Resistance Design Manual, Sound Control, Gypsum Association, GA-600-97 (15$^{th}$ Ed.) (120 pages), 1997.
FIRE Resistance Design Manual, Sound Control, Gypsum Association, GA-600-2000 (16$^{th}$ Ed.) (139 pages), 2000.
Noxon, Arthur M., *The Chain is as Strong as Its Weakest Link,* An article written for the first Hong Kong HiFi Show, 1993, Translated and Published in Chinese, http://www.acousticsciences.com/articles/chain.htm (7 pages).
*Quiet Lightweight Floor Systems,* Reprint from Sound and Vibration Magazine, Jul. 1992, by David A. Harris, Building & Acoustic Design Consultants (7 pages).
Dynamat materials http://web.archive.org/web/20010525113753/www.admteschusa.com/Dynamat.html Jun. 12, 2007, ADM Tech—Dynamic Control (15 pages).
Noise Killer: Pro Damping Compound Materials http://www.tnt-audio.com/clinica/noise.html May 18, 2007, 1998 (3 pages).
WAYBACKMACHINE search results for Jan. 1, 1996-Jun. 12, 2007 (1 page).
Unified Facilities Criteria (UFC) *Noise and Vibration Control,* UFC 3-450-01. May 15, 2003, Department of Defense (156 pages).
United States Gypsum, *Architectural and Construction Services, Design Data for Acousticians,* Feb. 1986 (4 pages).
*A Study of Techniques to Increase the Sound of Insulation of Building Elements,* Wyle Laboratories, Prepared for Dept. of Housing and Urban Development, Jun. 1973 (12 pages).
dB-Ply materials Sound Reducing Panels from Greenwood Forest Products, Inc., Apr. 24, 1997 (9 pages).
dB-Rock materials OMNI Products, Inc. (3 pages), Sep. 22, 1988.
ASC WallDamp materials from Acoustic Sciences Corporation http://web.archive.org/web/20021013031149/www.asc-soundproof.com/index-walldamp . . . May 18, 2007 (21 pages).

(56) References Cited

OTHER PUBLICATIONS

Nordisk Akustik A/S materials, http://web.archive.org/web/200206240933724/www.nordisk-akustik.dk/html_uk/prod03.ht . . . Jun. 11, 2007 (4 pages).
IES 2000 *Dampening and Visocelastic Membranes* (Jul. 2, 2003) Atlanta.com/product (pp. 1-6).
WAYBACKMACHINE search results for Jan. 1, 1996-May 3, 2006 (1 page).
"*Damping of plate flexural vibrations by means of viscoelastic laminae*" by D. Ross, E.E. Ungar, and E.M. Kerwin—Structural Damping, Section III, ASME, 1959, New York (41 pages).
Vandersall, H. L., "*Intumescent Coating Systems, Their development and Chemistry*" J. Fire & Flammability, vol. 2 (Apr. 1971) pp. 97-140 (45 pages).
Noise and Vibration Control Engineering, *Principles and Application*, pp. 466-479, John Wiley & Sons, 1992, Beranek, Leo L. and Ver, Istvan L. (editors) (9 pages).
International Search Report, PCT/US08/68676, mailing date Sep. 25, 2008.
Written Opinion of the International Searching Authority, PCT/US08/68676, Sep. 25, 2008.
International Search Report and Written Opinion for International Application No. PCT/US10/36411 dated Jul. 27, 2010.
M.N. Darrouj et al., "Optimum Design of Constrained Layer Damping Panels", Materials & Design, vol. 10, No. 4, pp. 202-208, Jul.-Aug. 1989.
Z. Xie et al., "An enhanced beam model for constrained layer damping and a parameter study of damping contribution", Journal of Sound and Vibration, vol. 319, Issues 3-5, pp. 1271-1284, Jan. 23, 2009.
G. Lepoittevin et al., "Optimization of segmented constrained layer damping with mathematical programming using strain energy analysis and modal data", Materials & Design, vol. 31, Issue 1, pp. 14-24, Jan. 2010.
D.I.G. Jones, Handbook of Viscoelastic Vibration Damping, John Wiley and Sons, pp. 284-297, Aug. 2001.
Pritz. "Loss Factor Peak of Viscoelastic Materials: Magnitude to Width Relations", J. of Sound and Vibration, 246(2): 265-280, 2001.
Cheng et al. "Vibration Attenuation of Panel Structures by Optimally Shaped Viscoelastic Coating with Added Weight Considerations". Thin-Walled Structures, 21 (1995), pp. 307-326.
AVS Forum "Green Glue(R)", http://www.avsforum.com/avs-vb/archive/Index.php/t-456614-p-2.html, retrieved Jul. 19, 2010.
www.acousticalsolutions.com/products/pdfs/install_green_glue.pdf. accessed Nov. 5, 2009. web date Jun. 19, 2006.
Spec-Data Quiet Solution Datasheet, Reed Construction Data, (2005).
Armstrong Basic Drywall Grid Installation Guide, http://web.archive.org/web/*/http://www.armstrong.com/common/c2002/content/files/4279.pdf. (Original Publication Date May 30, 2005, Retrieved Aug. 19, 2008).
Notification of Transmittal of the International Search Report in corresponding International Application No. PCT/US08/59960 dated Jul. 11, 2008 (1 page).
International Search Report in corresponding International Application No. PCT/US08/59960 dated Jul. 11, 2008 (2 pages).
Written Opinion of the International Searching Authority in corresponding International Application No. PCT/US08/59960 dated Jul. 11, 2008 (7 pages).
International Search Report and Written Opinion dated Jan. 15, 2009.
Notification of Transmittal of the International Search Report in corresponding International Application No. PCT/US08/59540 dated Aug. 15, 2008 (1 page).
International Search Report l corresponding International Application No. PCT/US08/59540 dated Aug. 15, 2008 (2 pages).
Written Opinion of the International Searching Authority in corresponding International Application No. PCT/US08/59540 dated Aug. 15, 2008 (9 pages).
PCT International Search Report (ISR) and the Written Opinion mailed May 3, 2012, in related International Application No. PCT/US2012/022073.
The Second Office Action issued Nov. 26, 2012 in Chinese Application No. 200980115534.6, Chinese counterpart of U.S. Appl. No. 13/028,088, 17 pages total.
Non-Final Office Action dated May 3, 2013 from related U.S. Appl. No. 11/697,691, 15 pages.
Office Action mailed Feb. 26, 2013 in related Japanese Application No. 2010-502345.
Examination Report mailed Mar. 5, 2013 in related European Application. No. 09743797.4.
Extended European Search Report and Search Opinion mailed Jan. 30, 2013 in related European Application No. 08745548.1.
Final Office Action mailed Feb. 26, 2013 in related Japanese Application No. 2009-185945.
Office Action mailed Feb. 26, 2013 in related Japanese Appl. No. 2010-503215.

* cited by examiner

METHODS OF MANUFACTURING ACOUSTICAL SOUND PROOFING MATERIALS WITH OPTIMIZED FRACTURE CHARACTERISTICS

CONTINUATION IN PART

This application is a continuation-in-part of, claims priority to and the benefit of, U.S. patent application Ser. No. 12/117,687, (now U.S. Pat No. 7,908,818), by Brandon D. Tinianov, Kevin J. Surace, and Albert C. Yanez, filed in the U.S. Patent and Trademark Office on May 8, 2008, incorporated herein by reference in its entirety. This application is also a continuation-in-part of, claims priority to and the benefit of, U.S. patent application Ser. No. 11/770,476 (now abandoned), by Brandon D. Tinianov and Kevin J. Surace, filed in the U.S. Patent and Trademark Office on Jun. 28, 2007, incorporated herein by reference in its entirety.

CROSS REFERENCE TO RELATED APPLICATIONS

This application is related to: (i) commonly-assigned U.S. patent application Ser. No. 10/658,814 filed Sep. 8, 2003, by K. Surace and M. Porat, now U.S. Pat. No. 7,181,891, issued Feb. 27, 2007 titled "ACOUSTICAL SOUND PROOFING MATERIAL AND METHODS FOR MANUFACTURING SAME"; and: (ii) commonly assigned U.S. patent application Ser. No. 11/697,691 filed Apr. 9, 2007 by B. Tinianov, entitled "ACOUSTICAL SOUND PROOFING MATERIAL WITH IMPROVED FRACTURE CHARACTERISTICS AND METHODS FOR MANUFACTURING SAME" which are incorporated herein by reference in their entirety; and: (iii) commonly-assigned U.S. Pat. No. 7,883,763, entitled "ACOUSTICAL SOUND PROOFING MATERIAL WITH CONTROLLED WATER-VAPOR PERMEABILITY AND METHODS FOR MANUFACTURING SAME," by Brandon Tinianov, issued Feb. 8, 2011, the contents of which are incorporated herein by reference in their entirety; and (iv) commonly-assigned U.S. patent application Ser. No. 11/739,520, (now U.S. Pat. No. 8,397,864), filed on Apr. 24, 2007, by Brandon D. Tinianov and Kevin J. Surace, entitled "ACOUSTICAL SOUND PROOFING MATERIAL WITH IMPROVED FIRE RESISTANCE AND METHODS FOR MANUFACTURING SAME" which are incorporated herein by reference in their entirety.

BACKGROUND

Currently, the manufacture of bulky and/or heavy laminated panels for use in building construction requires a large area for manufacturing. In addition to the bulk associated with the material in-process, the area required for manufacturing is increased by any process step requiring the material be staged for a long period of time. For a given throughput of material, the area needed increases with additional processing steps and with a longer processing time at any step.

For example, the laminated structure disclosed in the aforementioned U.S. Pat. No. 7,181,891 comprises two external layers of a non-metallic material (which in one embodiment are paper faced sheets of gypsum wallboard), and an internal constraining layer, attached to each other by adhesive layers of viscoelastic glue. In some embodiments other materials are incorporated between the outer gypsum layers. In one embodiment the process of manufacturing a laminar structure, for example the structure disclosed in the '891 patent, includes drying a completed structure whilst pressure is applied to the structure. Depending upon the materials that make up the laminar structure, a dwell time (defined as the time required for a single process step) of several hours to a few days is required for the adhesive to properly dry, during which time other similar individual structures may be constructed which also require a dwell time of several hours to a few days to dry. The long drying time is due to the time required for moisture in the adhesive to soak into the gypsum sheets, the gypsum sheets then transporting the moisture to the surrounding environment via evaporation. A significant volume of material is staged at the drying step in the described construction sequence, the volume depending upon the production rate. As a result, a large drying chamber corresponding to the volume of a single structure multiplied by the finished product throughput desired and the dwell time of the instant step is required. Further, some steps of the manufacturing process may require that the drying chamber be maintained at a specified elevated temperature and low relative humidity, an energy intensive requirement.

For example, a production demand of one thousand finished four-foot by eight foot by one-inch structures per day, with a dwell time at a certain step requiring forty-eight hours of drying at a constant temperature of 120 to 140 degrees Fahrenheit, a relative humidity of about thirty percent, and a constant airflow requires a staging area providing the required environmental conditions for two thousand structures at any given time, such staging area providing a minimum of 25 feet of vertical clearance on an approximately 25 foot by 45 foot footprint, amounting to 28,125 cubic feet of conditioned space. When manufacturing demands more than one thousand finished panels per day, even more drying volume is required. Any other process steps also requiring significant dwell time similarly increase the facilities needed for a given manufacturing throughput. A long cycle time, defined as the time required to construct a finished structure from start to finish, also extends the time required for a manufacturing operation to respond to an increase in demand for the manufactured product.

Another critical aspect of the existing manufacturing processes is that the outer layers of the laminated panel (in one embodiment, paper faced gypsum wallboard) consist of complete and finished forms of traditional building materials. It has been demonstrated by U.S. patent application Ser. No. 11/697,691, that for embodiments employing gypsum wallboard, it is preferable if there is no facing paper on the interior surfaces that are in contact with the viscoelastic glue. In U.S. patent application Ser. No. 11/697,691 it was proposed that the panels to be combined into the laminated soundproof panel be manufactured or sourced so as not to have a durable paper across one face. This is difficult in practice because the paper faces (on either side of the gypsum wallboard panel) serve as a durable, wear resistant surface and also significantly improve the bending stiffness of the gypsum wallboard. Without paper on one surface, the modified gypsum wallboard is particularly susceptible to damage and/or destruction during transport and handling.

A second concern with these modified, paperless gypsum wallboard source materials is that their manufacture is difficult, driving their prices higher than the prices of traditional panels. Also, only a few manufacturers are able to produce these modified materials and as a result, the material supply for the laminated panels may be limited.

A figure of merit for the physical characteristics of construction panels is the material's flexural strength. This refers to the panel's ability to resist breaking when a force is applied to the center of a simply supported panel. Values of flexural strength are given in pounds of force (lbf) or Newtons (N).

The measurement technique used to establish the flexural strength of gypsum wallboard or similar construction panels is given in ASTM C 473 "Standard Test Methods for the Physical Testing of Gypsum Panel Products." An updated version of the standard, ASTM C 473-10, available from ASTM International, is incorporated herein by reference in its entirety.

What is needed is a manufacturing method for an easily scored and snapped laminar structure wherein intermediate process staging of product during manufacture is minimized, and raw material costs are greatly reduced.

SUMMARY

A laminar structure comprising a sandwich of a plurality of materials is constructed using process methods wherein the dwell time at certain steps is reduced from hours or days to a few minutes. In one embodiment adhesive is dried prior to adding any additional layers to the laminated build-up, eliminating the lengthy process step of drying the complete laminated structure. The adhesive is dried by exposing the surface of the specifically formulated adhesive to a low-moisture environment immediately after the adhesive is applied, forming a pressure sensitive adhesive ("PSA"). The next layer in the sandwich may then be applied with no further drying time required. In one embodiment the individual process dwell times and total cycle time are shortened enough to permit construction of complete laminar structures using a conveyor belt type assembly line apparatus, wherein no in-process material is staged or stacked up.

Additionally, the process employs a novel manufacturing step in which a stock gypsum wallboard panel is bisected along its thickness to produce two congruent halves that lack paper on their interior surfaces. This step reduces the raw of the stock materials and for a laminated panel in accordance with this invention maintains or improves the fracture characteristics of the laminated panel (ability to score and snap the panel).

This invention will be more fully understood in view of the following drawings and written description.

DESCRIPTION OF SOME EMBODIMENTS

| Definitions | |
| --- | --- |
| Term | Definition |
| Cycle time | Total time duration required to manufacture a single article. |
| Dwell time | Time duration required for a single process step. |
| Staging | Holding material at a certain process step for a given dwell time. |
| Stock gypsum wallboard | Standard faced drywall panel used as feedstock material for the laminated panel manufacturing process. The panel may be faced on four sides by paper, fiberglass mat, or another suitable material. |
| Sandwich | A stack comprising the materials (continuous or not continuous) forming a laminate structure which may be incomplete or complete at an instant point in a process sequence. |
| PSA | Pressure sensitive adhesive; a type of adhesive which does not require drying time after a new layer of material is brought into contact with the adhesive. |

A laminar substitute for drywall comprises a sandwich of two outer layers of selected thickness gypsum board or other material which are glued to each other, using a sound dissipating adhesive wherein the sound dissipating adhesive is applied in a certain pattern to all or less than all of the interior surfaces of the two outer layers. In one embodiment, the adhesive layer is a specially formulated viscoelastic material of a specific thickness. According to some embodiments the viscoelastic glue may be made of materials as set forth in Table 1.

TABLE 1

| | WEIGHT % | | | | | |
| --- | --- | --- | --- | --- | --- | --- |
| COMPONENTS | Min | Max | Preferred | Shear Modulus $10^3$ Pa (ex. 160 Hz) | Shear Modulus $10^5$ Pa (ex. 2500 Hz) | Shear Modulus $10^6$ Pa (ex. 5500 Hz) |
| acrylate polymer | 15.0 | 60.0 | Shear Modulus Dependant | 60 ± 2 | 40 ± 2 | 30 ± 2 |
| Plasticizer | 0.0 | 15.00 | 7.00 | 7.00 ± 1 | 7.00 ± 1 | 7.00 ± 1 |
| hydrophobic silica | 0.00 | 0.50 | 0.21 | <0.5 | 0.21 | 0.21 |
| paraffin oil | 0.10 | 4.00 | 1.95 | <0.70 | 1.95 | <4.00 |
| Silicon dioxide | 0.00 | 0.30 | 0.13 | <0.30 | 0.13 | 0.13 |
| Sodium carbonate | 0.01 | 3.00 | 0.66 | <3.00 | 0.66 | 0.66 |
| Stearic acid, aluminum salt | 0.00 | 0.30 | 0.13 | <0.30 | 0.13 | 0.13 |
| surfactant | 0.00 | 1.00 | 0.55 | <0.70 | 0.55 | 0.55 |
| rosin ester | 1.00 | 70.00 | 45.00 | 2.00 | 7.00 | 45.00 ± 5 |
| water | 20.0 | 40.0 | 25.00 | 28.00 ± 1 | 24.00 ± 1 | 21.00 ± 1 |
| 2-Pyridinethiol, 1-oxide, sodium salt | 0.00 | 0.30 | 0.17 | 0.17 | 0.17 | 0.17 |

TABLE 1-continued

| COMPONENTS | Min | Max | Preferred | Shear Modulus $10^3$ Pa (ex. 160 Hz) | Shear Modulus $10^5$ Pa (ex. 2500 Hz) | Shear Modulus $10^6$ Pa (ex. 5500 Hz) |
|---|---|---|---|---|---|---|
| High Tg (>0 C.) acrylic polymer or latex, particle size <0.35 uM | 0.00 | 30.0 | Shear Modulus Dependant | 0 | 20 | 30 (in lieu of acrylate polymer) |

The formulations of Table 1 are exemplary of viscoelastic glues that may be used in some embodiments. Other formulations may be used; the ranges given in Table 1 above are examples of some embodiments that have been tested. The physical solid-state characteristics of a glue used according to some embodiments of the present invention may include:
1) A broad glass transition temperature below room temperature;
2) mechanical response typical of a rubber (i.e., elongation at break, low elastic modulus);
3) strong peel strength at room temperature;
4) weak shear strength at room temperature;
6) does not dissolve in water (swells poorly).

The three columns to the right of Table 1 show the shear modulus of the resulting layer of glue in Pascals (1 Pa=1 N/m$^2$). Also included in Table 1 are the frequencies of sound for which the noise attenuation is maximum across a layer of glue, given its shear modulus.

The inclusion of rosin ester in the viscoelastic glue composition of Table 1 enhances the pressure sensitive adhesive (PSA) quality of the glue. In embodiments consistent with the descriptions provided herein, a PSA may be a layer of viscoelastic glue which has been dried to form a viscoelastic pressure sensitive adhesive having a moisture content of less than 5% by weight. In one embodiment of the present invention, a concentration of approximately 5% by weight of rosin ester results in an appropriately 'tacky' glue composition. Some embodiments of the present invention may include a viscoelastic glue having concentrations of up to 70% by weight of rosin ester. Some embodiments of the present invention may comprise viscoelastic glues using a tackifier agent in a selected concentration between 1% and about 70%. The tackifier agent may be a natural resin or a synthetic resin.

Some embodiments of the present invention may include materials and components that give a fire-resistant quality to the glue composition in the layer of glue. The materials and procedures for this purpose may be such as described in detail in U.S. patent application Ser. No. 11/739,520, (now U.S. Pat. No. 8,397,864), by Brandon Tinianov et al. filed on Apr. 24, 2007, the contents of which are incorporated herein by reference in their entirety. In some embodiments, intumescent compounds may be added to the viscoelastic glue in order to produce fire-resistance enhancement. Intumescent compounds are materials which, when heated above their critical temperature, will bubble and swell, thereby forming a thick, non-flammable, multi-cellular, insulative barrier up to 200 or more times their original thickness. In some embodiments of the present invention, materials acting as intumescent compounds may be Zinc Borate at a preferred concentration of 12%, Melamine Phosphate at a preferred concentration of 6%, Ammonium Polyphosphate at a preferred concentration of 6%, or any combination of them. All concentrations are given in percent by weight.

By varying the amount of the chemical components included in the glue layer within the ranges shown in Table 1 several desired shear moduli of glue, from $10^3$ Pa to over $10^6$ Pa, may be obtained. According embodiments consistent with Table 1, the shear modulus of the glue may be changed by selecting the percent by weight of an acrylic polymer. Some embodiments of the present invention may use concentrations of acrylic polymer ranging from approximately 15% to approximately 60% by weight. In some embodiments, the acrylic polymer used may be an acrylate polymer or latex. Some embodiments of the present invention may include acrylate polymers having a glass transition temperature (T$_g$) greater than −40° C. in a selected concentration between approximately 30% and approximately 60% by weight. In some embodiments, addition of high T$_g$ polymers to the viscoelastic glue may increase its shear modulus. One example of such a high T$_g$ material (T$_g$>0° C.) may be acrylic polymer or latex, having particle sizes less than about 0.35 μm (micrometers), added to the glue composition in concentrations between 0% and 30% by weight (Table 1).

Some embodiments of the present invention may use various concentrations of a plasticizing compound in order to achieve different shear moduli in the resulting viscoelastic glues. In some cases, the concentration of a plasticizing compound may be between about 0% and about 15% by weight of the viscoelastic glue. Plasticizing compounds used according to some embodiments of the present invention may include adipate plasticizers, or citrate plasticizers. Adipate plasticizers may improve water resistance for the viscoelastic glue composition. Citrate plasticizers may reduce the biochemical impact of the viscoelastic glue composition during manufacturing of the glue, and during installation of the laminate.

Provided on the interior surfaces of the two gypsum boards, the adhesive layer is about 1/16 inch thick. In various embodiments a differing number of layers of material of different composition are sandwiched between the outer gypsum boards, each layer glued to adjoining layers by the viscoelastic glue. In the following discussion "adhesive," "glue," and "PSA" may be used interchangeably to refer to a layer of material in the context of a laminar structure sandwich.

Figure 1:
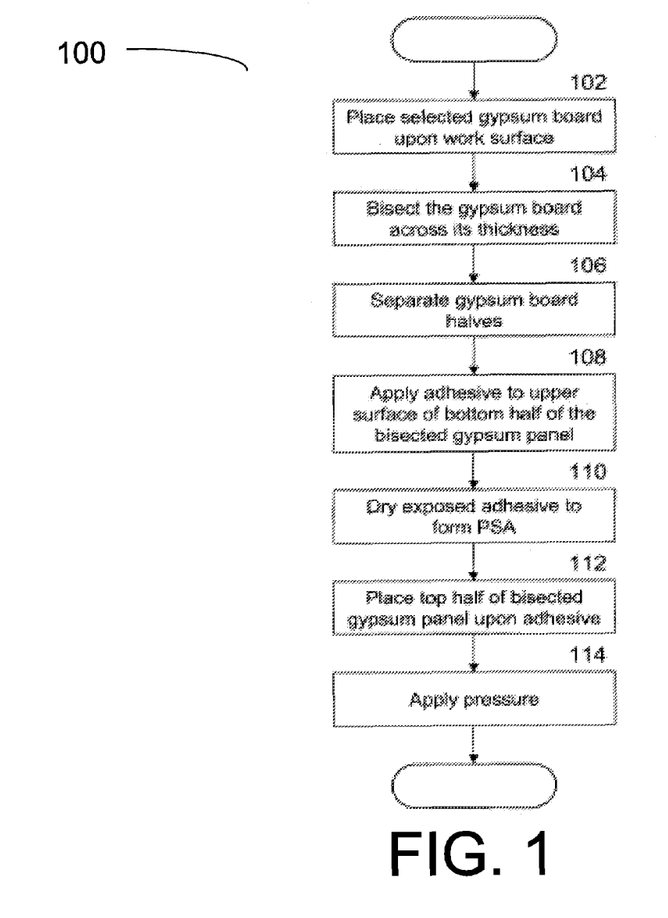
FIG. 1 is an example of a process sequence in accordance with some embodiments disclosed herein.

Referring to FIG. 1, an example of a method 100 according to the present invention is presented. Top and bottom layers as in FIG. 1 may be as described in the context of FIGS. 2 through 5, according to some embodiments. Step 102 specifies a stock material in the form of a gypsum wallboard. This material is common to the building industry and consists of a gypsum or gypsum and fiber enhanced composite core surrounded by a layer of paper bonded to the core. Typically the short edges are left with the gypsum core exposed. The gypsum wallboard is typically 4 feet wide by 8 feet long, though lengths of 9, 10, and 12 feet are common as well. The gypsum sheet can range in thickness from about ¼ inch thick to over one inch thick. Such products are commonly available in the construction materials field and are manufactured by USG Corporation of Chicago, Ill., the National Gypsum Company, of Charlotte, N.C., and Saint-Gobain, of Courbevoie, France.

Figure 2:
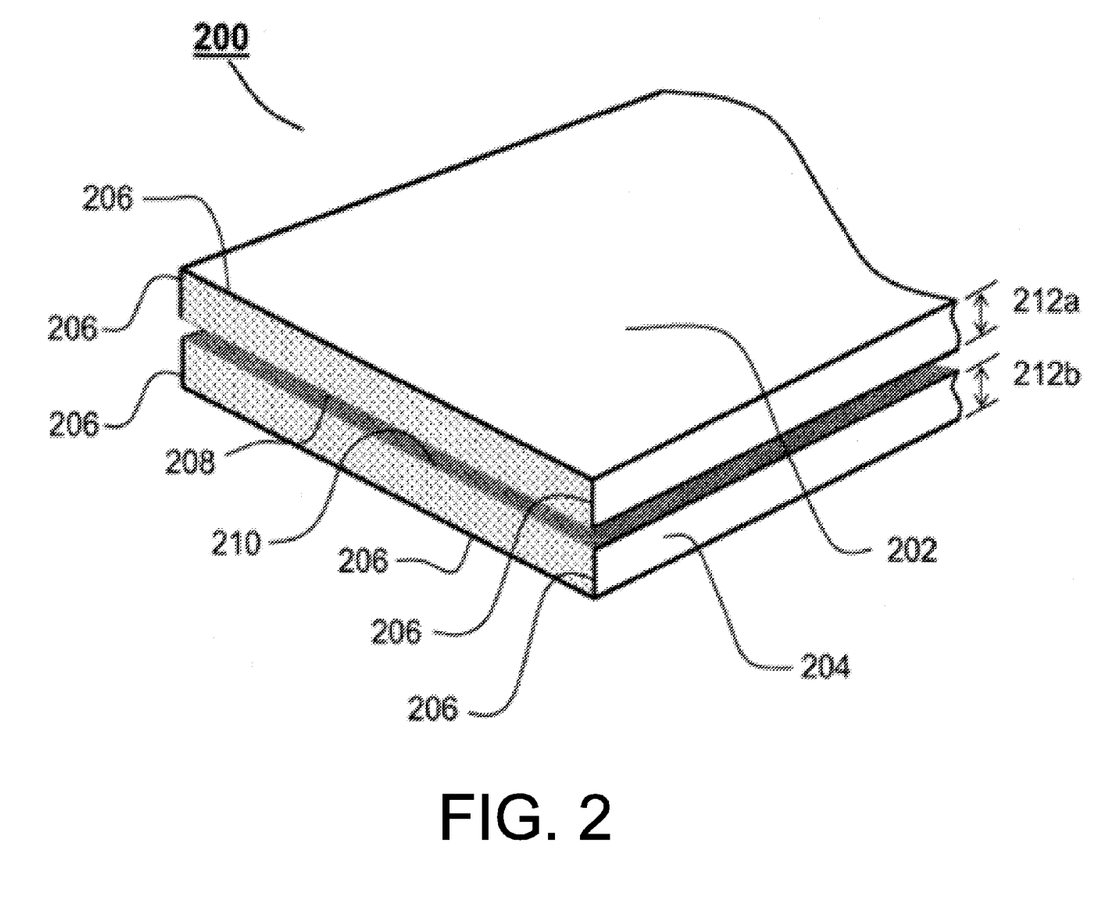
FIG. 2 shows a bisected stock gypsum wallboard panel.

Manufacturing process step 104 specifies that the gypsum wallboard is bisected across its thickness. The resulting cut panel is shown in perspective in FIG. 2. In FIG. 2, article 200 represents the bisected panel. A first half 202 is separated from the second half 204 by a means shown in FIG. 3. Halves 202 and 204 may be of equal thickness or unequal thickness 212a and 212b, depending on the requirements of the final laminated assembly. It can be seen in the figure that the paper 206 extends about the exterior of panel 200, but not the interior surfaces 208 and 210 exposed by the separation process.

The novel bisection of the gypsum core offers two important advantages over the existing methods. First, a single bisected sheet is significantly less expensive than a comparable laminate of two sheets of half thickness. For example, ⅝ inch thick sheets of 4 foot wide by 8 foot long type × gypsum have a wholesale price of approximately $150 per one thousand square feet (msf). A ⁵⁄₁₆ inch thick panel, also 4 foot wide by 8 foot long, has a wholesale price of approximately $125 to $150 per one thousand square feet. However, without bisection, two ⁵⁄₁₆ inch thick sheets are required to replace every bisected ⅝ inch thick panel. Therefore, in this example, the cost of the laminated gypsum wallboard is $150 msf for the bisected panel versus about $250 to $300 msf for a stacked pair of ⁵⁄₁₆ inch thick panels. The bisection novelty saves approximately 40% to 50% of the panel material costs. A second advantage is that the bisection technique allows for optimum fracture characteristics (as described in U.S. patent application Ser. No. 11/697,691) but without non-standard outer layers of material. This allows for much greater variability in sourcing feed stock panels. As a result, the novel manufacturing method has better material supply and pricing.

Figure 3A:
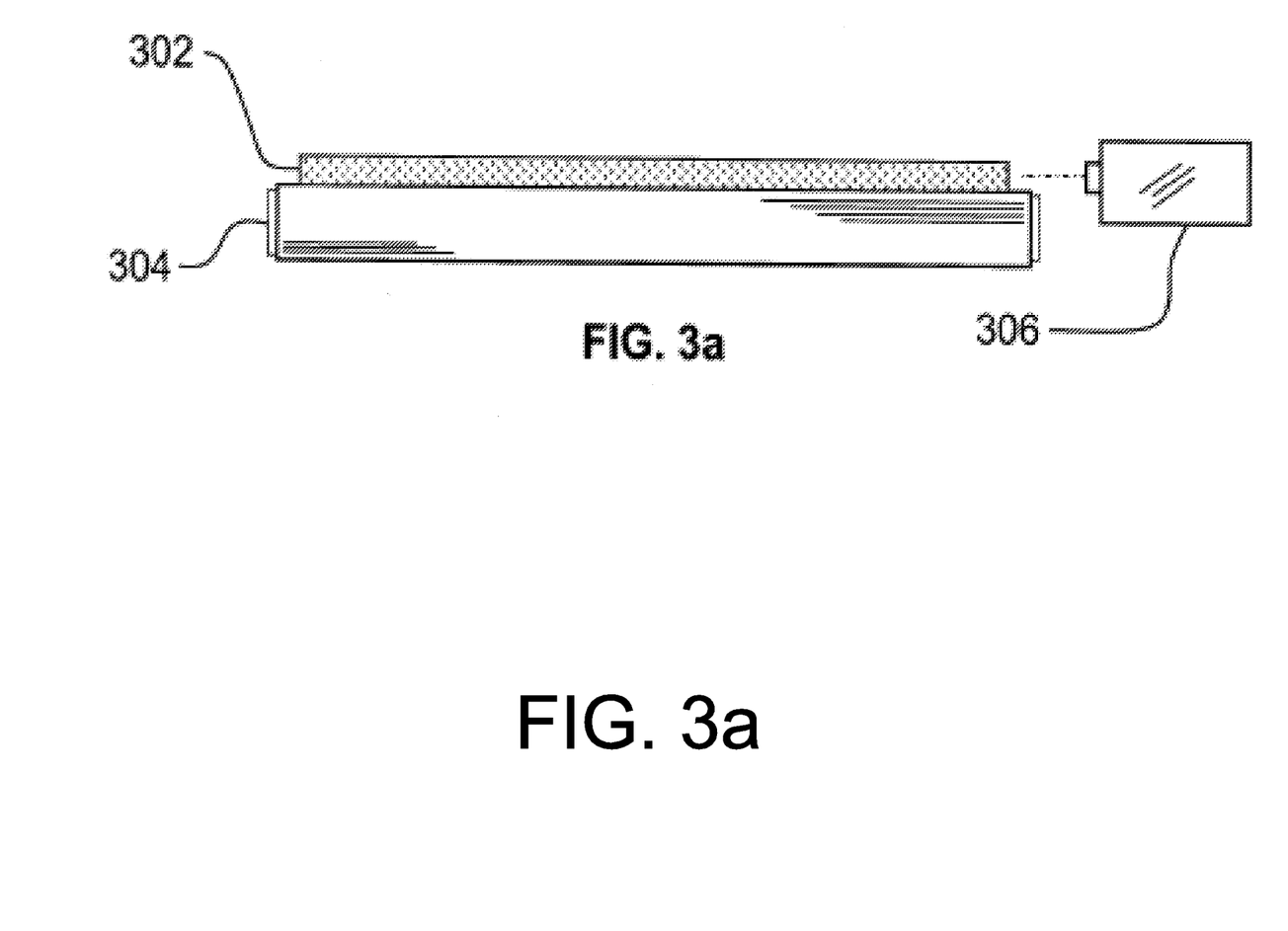
FIGS. 3a and 3b show methods of bisecting the gypsum wallboard stock panels.
Figure 3B:
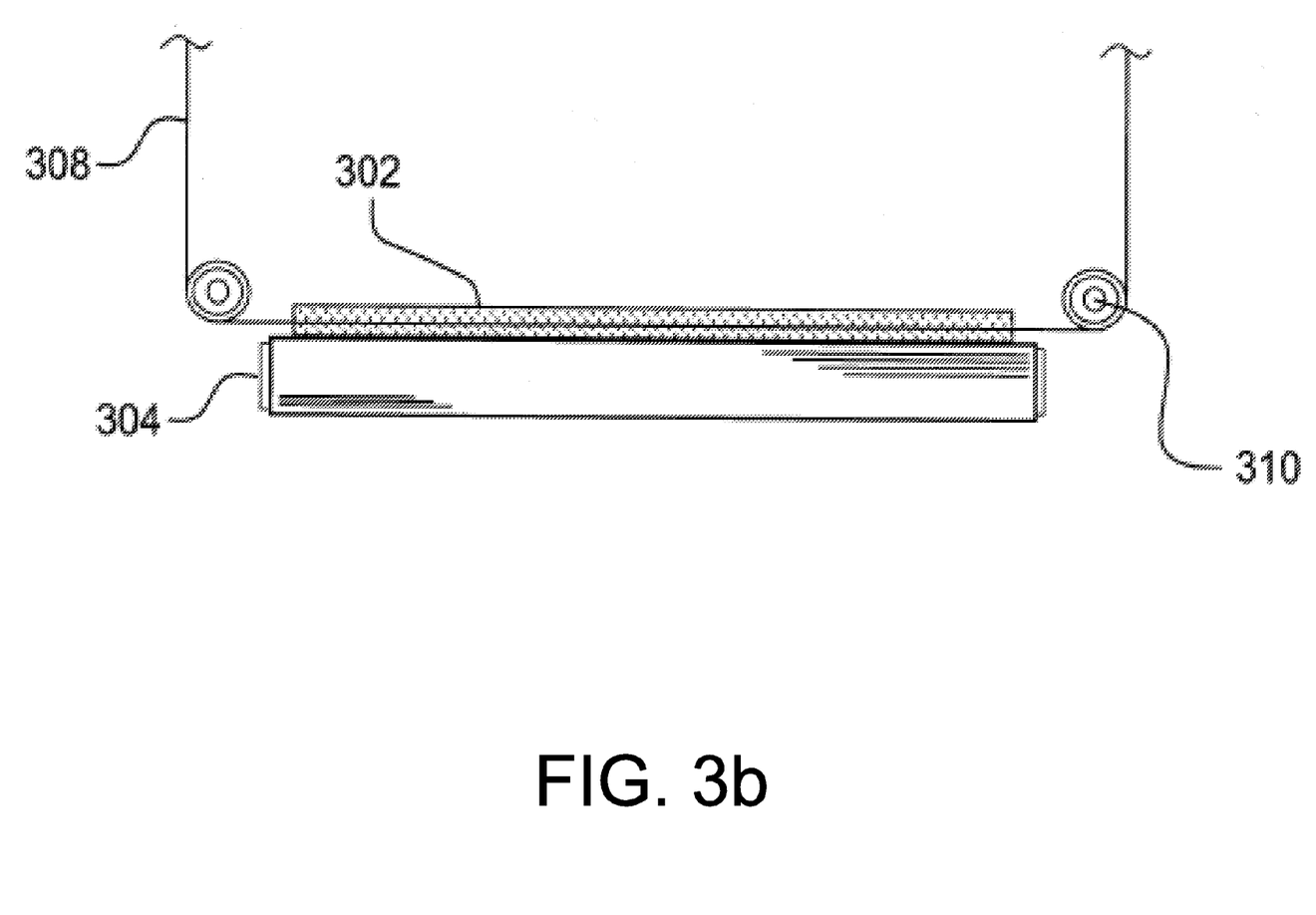

FIGS. 3a and 3b show two exemplary methods for bisecting the stock gypsum wallboard panel. FIG. 3a depicts the stock gypsum wallboard panel 302 resting on a platform, rollers, conveyor belt, or other suitable support 304. At the right side of the FIG. 3a, 306 depicts a high intensity laser used for cutting the panel without direct contact. Suitable commercial panel cutting equipment is available, such as a high-intensity $CO_2$ laser based on the CS0405 ceramic cutting laser manufactured by Han's Laser Technology Company, of Houston, Tex. This method has proven viable as a method of panel bisection in limited production trials.

FIG. 3b again depicts the stock gypsum wallboard panel 302 resting on a platform, rollers, conveyor belt, or other suitable support 304. Across the face of the panel is a mechanical cutting device in the form of a saw blade 308 and a motorized support structure such as a band saw tool 310. Suitable commercially-available panel cutting equipment includes the Bavaria SL 130i mobile sawmill manufactured by SERRA Maschinenbau GmbH of Rimsting, Germany. This saw has a linear traversing head attached to a rigid panel support structure. Trials employing the SL 130i were able to bisect the gypsum panel at a rate of approximately thirteen feet per minute. This rate is consistent with the improved manufacturing rates disclosed herein.

Following the panel's bisection, the panels are separated in process step 106 so that lower panel half 204 may be coated in part or entirely with glue by an appropriate means from above as specified by process step 108. The top portion of the bisected panel 204 is best lifted using a distributed vacuum suction cup system. Commercially available vacuum assist systems are the Saugerspinne and the VacuMaster Light vacuum assisted lifting devices manufactured by J. Schmalz GmbH of Glatten, Germany.

Figure 4:
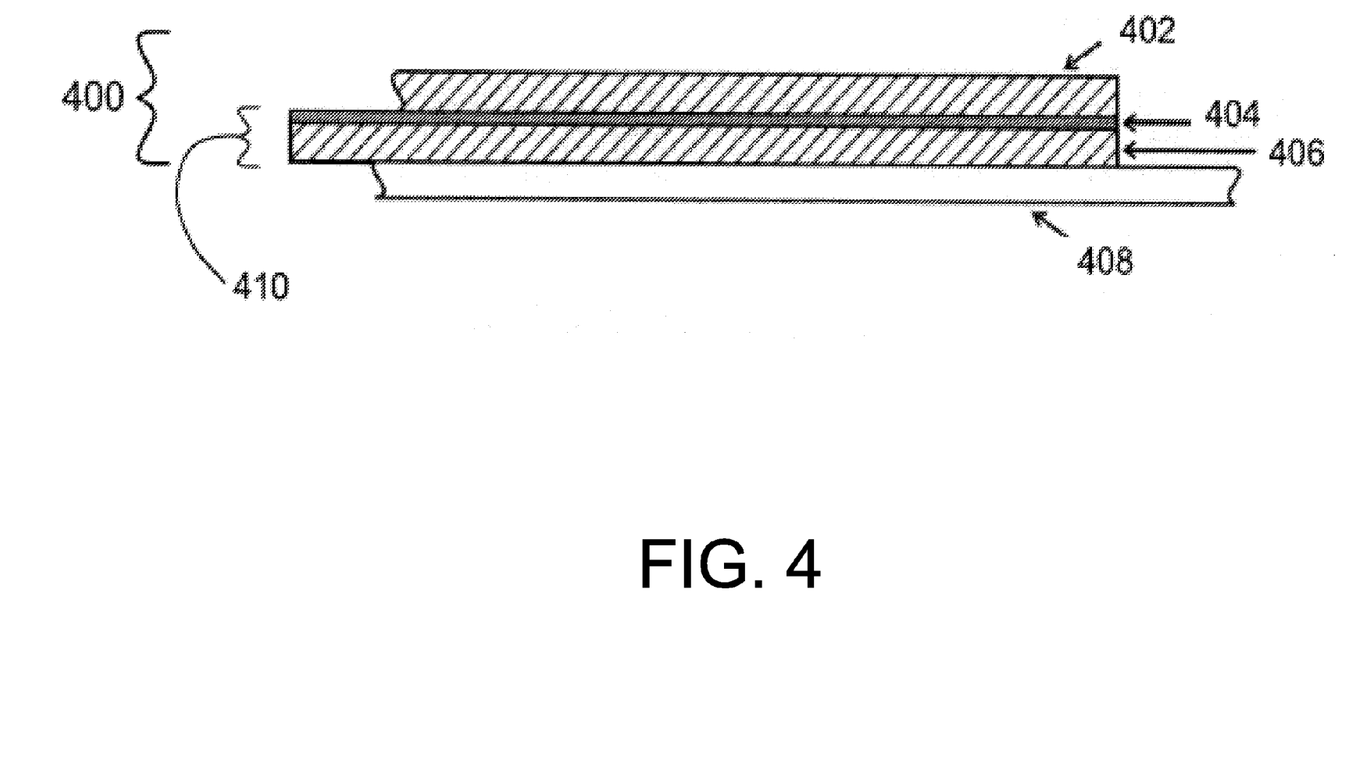
FIGS. 4 and 5 show a side view of a laminated sound attenuating structure fabricated by methods in accordance with this invention.

FIG. 4 shows a bottom gypsum board 406 of a selected thickness placed upon a work surface 408. As noted earlier, in some embodiments work surface 408 is a conveyor belt for moving the material through the process steps, for example a one hundred foot OAL ACSI Model 190RB roller bed belt conveyor, available from Conveyor Systems & Engineering, Inc., Elk Grove, Ill., 60007. A gypsum board 206 may be placed onto the work surface 408 using overhead lifting equipment with vacuum cups, or by a worker simply picking up a panel 406 and putting it in the proper place. An elevating apparatus may move gypsum boards to the level of the work surface. An adhesive 404, according to embodiments consistent with Table 1, is applied with full or partial coverage to the upper surface of the bottom gypsum board 406. If coated partially with glue, any one of a number of selected glue patterns can be used including stripes, random patterns, and any other appropriate geometric shapes. The adhesive 404 may be applied using a roller, (similar to a paint roller), a brush, a broad knife, or sprayed on with dispensing nozzles. The adhesive 404 may cover the entire upper surface of the gypsum 406, or, in some embodiments, less than all of the surface may have adhesive 404 applied, for example as disclosed in aforementioned U.S. Pat. No. 7,883,763, by Brandon Tinianov, the contents of which are incorporated herein in their entirety. The bottom gypsum layer 406 with the applied adhesive 404 forms an intermediate sandwich structure 410.

Next, the adhesive 404 is dried as described in manufacturing process step 110, so that the resulting moisture content in the adhesive is no greater than five percent by weight.

In one embodiment of drying step 110, a layer of viscoelastic glue at a thickness between one thirty second inch (¹⁄₃₂") and one eighth inch (⅛") on a panel of material four (4) feet by eight (8) feet was subjected to a flow of ambient air (typically between nineteen degrees centigrade (19° C.) and twenty four degrees centigrade (24° C.) at about fifty thousand cubic feet per minute (50,000 ft³/minute). The initial moisture content of the viscoelastic glue was about thirty percent (30%) by weight and after about five minutes of air flow the moisture content had been reduced to about five percent (5%) by weight.

Figure 6:
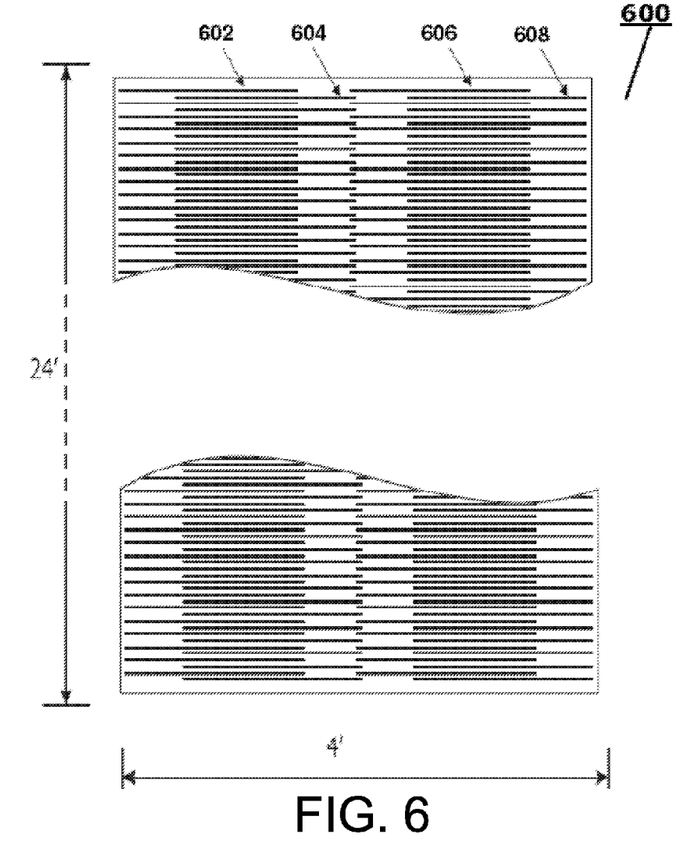
FIG. 6 shows a diffuser panel with a plurality of lateral openings (of which openings 602 to 608 are shown) for passing a drying gas to be used to convert a viscoelastic glue with moisture into a viscoelastic pressure sensitive adhesive ("PSA").

A variety of methods may be used to dry the adhesive 404 in drying step 110. In one embodiment the sandwich with exposed adhesive 410 is passed under a gas diffuser, wherein a volume of gas, for example fifty cubic feet per minute of air, is provided through openings in the diffuser located between about one (1) inch and one (1) foot above the glue. In some embodiments the provided gas is ambient air. In other embodiments the provided gas is preheated and/or dehumidified air. The gas-blowing system comprises a plenum chamber (not shown) for receiving pressurized gas from a blower, the pressurized gas subsequently flowing out through openings in the diffuser onto the surface of the exposed adhesive. FIG. 6 illustrates an example of a diffuser panel 600. Diffuser panel 600 faces the sandwich 410 as the sandwich 410 passes underneath the diffuser (assuming a conveyor belt method). In the example shown, openings 602, 604, 606, 608 are approximately eighteen inches long (in the short direction of the panel 600), one eighth of an inch wide, on one-half inch centers, staggered by five to six inches and the glue layer passes from one (1) inch to one (1) foot below the diffuser. Other designs for diffuser panel 600 openings may be used, for example uniformly distributed small holes.

In one embodiment the intermediate panel sandwich 410 is moved on a conveyor belt 408 at ten feet per minute about six (6) toe eight (8) inches under a gas diffuser panel 600, wherein the diffuser 600 is four feet wide and twenty-four feet long (in the direction of belt travel). The adhesive is therefore exposed to the flowing gas of ambient temperature air, approximately 70 degrees Fahrenheit and 30% relative humidity for approximately 2.4 minutes. The exact exhaust area and shape of the diffuser 600 and the openings are not critical, providing the exhaust area of the diffuser 600 permits the desired gas flow, and provided further that the exhaust area of diffuser panel 600 is low enough such that the plenum chamber has adequate back pressure to provide an approximately even flow of gas out of the diffuser. In one embodiment the gas flow is approximately 50,000 cubic feet per minute.

In embodiments of drying step 110 wherein a conveyor belt is not used, the intermediate panel sandwich 410 may be placed upon work surface 408, which may or may not be the same work surface upon which the panel 210 was placed for application of the adhesive 404, and wherein a diffuser 600 approximating the size and shape of the panel sandwich 410 and approximately aligned over the panel sandwich blows gas over the exposed adhesive, for example air at approximately seventeen feet per second velocity with about 50,000 cubic feet per minute volume. One parameter in the process is the degree of dryness of the adhesive attained in transforming the adhesive 404 into a PSA. For a specific implementation according to the method of the present invention, the combination of drying time, gas flow rate, diffuser panel 600 opening area, temperature and humidity of the gas provided through the diffuser 600, and the thickness of the adhesive 404 are adjusted to provide a suitable moisture content in transforming the adhesive 404 into a PSA, for example five percent moisture by weight as measured with a moisture sensor such as the MW 3260 microwave moisture sensor manufactured by Tews Electronik of Hamburg, Germany. Assuming these factors are reasonably constant, the drying time is used as a predetermined time for drying step 110. If the adhesive is completely dried the next material in the sandwich may not stick to it. A moisture content of approximately five percent provides a tacky adhesive that has good adhesion characteristics but does not require further drying after the sandwich is assembled in manufacturing process step 112.

According to embodiments of a method of forming a laminated structure consistent with FIG. 1, drying step 110 may include exposing the applied adhesive to a low moisture environment. For example, drying step 110 may include exposing the intermediate panel sandwich 410 to air at room temperature conditions for a predetermined amount of time until the amount of moisture content in the adhesive layer is less than 5% by weight. The moisture content may be determined using a sensor as described above, and the drying process stopped at any point where the sensor measures about 5% or less (including zero) moisture content by weight, according to some embodiments. In such embodiments, the use of diffuser panel 600 may not be necessary, and the intermediate panel may be simply left to dry by standing in a storage location. Further, in some embodiments the storage location where intermediate panel sandwich 410 is placed may be an environment with controlled humidity and temperature conditions. For example, a room at 0% humidity and 25° C. may be used for drying storage of intermediate panel sandwich 410. In some embodiments, drying step 110 may take place while panel sandwich 410 is on a conveyor belt as described above, with no forced gas flowing onto panel sandwich 410.

Figure 5:
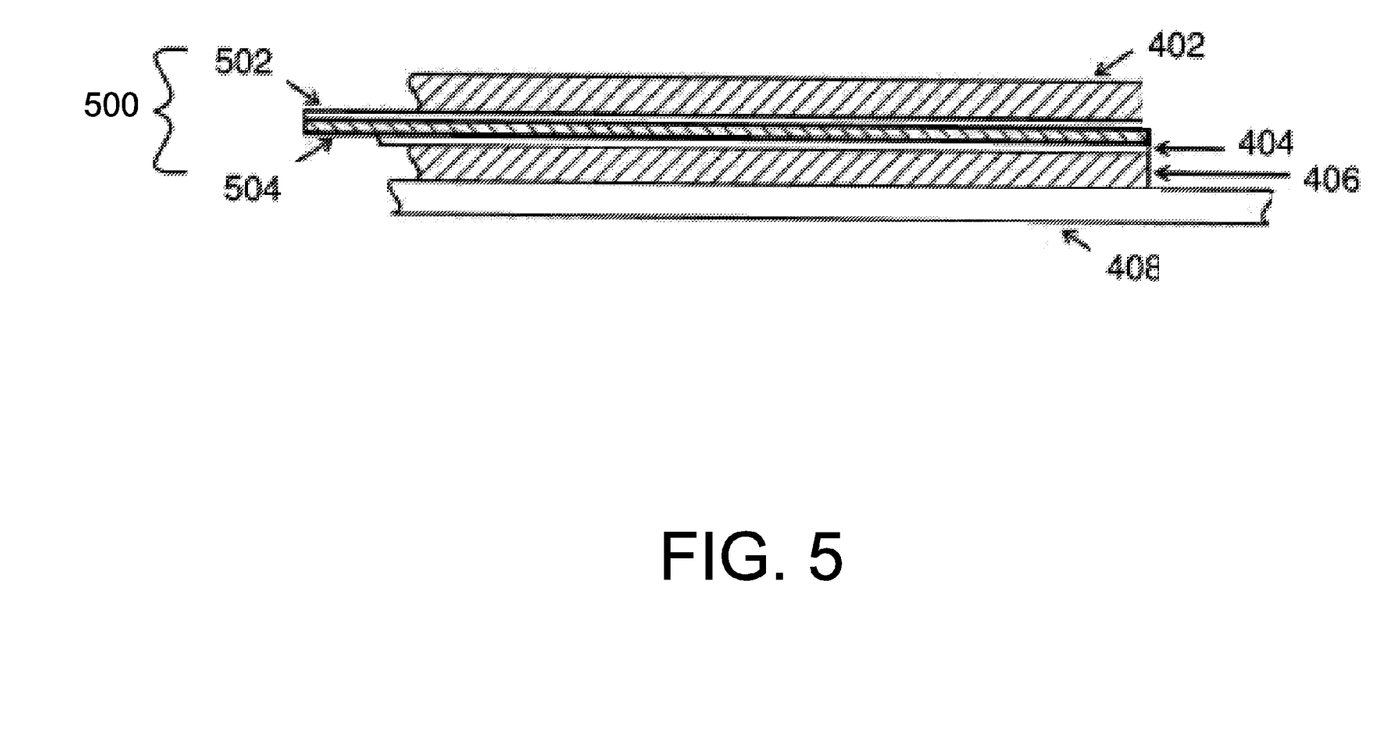

Referring to FIG. 5, in some structures to be constructed using the method of the present invention, there are additional layers of material 504 between the two outer panels of, for example, gypsum board 402, 406. Examples include vinyl, sheet metal, plywood, and gypsum, as discussed more expansively in the aforementioned U.S. Pat. No. 7,181,891. If such an option is selected, the additional material 504 is placed upon the sandwich 410 at step 112 (that is, upon the exposed PSA 404), then adhesive 502 is applied to the exposed surface of the newly placed material 504 at step 104, as before. The adhesive 502 is dried to form a PSA at step 106 and another option for an additional layer is considered at step 110. If no more material layers 504 are to be added the process continues with step 112 wherein a top gypsum board 402 is placed upon the PSA 502 to complete the sandwich to create assembly 500.

The fully-assembled laminated structure 400 according to some embodiments or structure 500 according to some embodiments is pressed together at step 114. In one embodiment laminated structure 400 or structure 500 is passed under a six-inch diameter roller (or the roller may instead be passed over the laminated structure 400 or structure 500) weighing approximately fifty pounds at approximately ten feet per minute. Following the application of pressure at step 114 the laminated structure 400 according to some embodiments, or 500 according to some embodiments is complete and ready for shipping; no further drying or other manufacturing process step is required.

While the process has been described as drying the viscoelastic glue to essentially create a viscoelastic pressure sensitive adhesive, the process can also be used to partially dry the viscoelastic glue thereby to shorten the time that the stacked structure, when fully assembled, must be placed in a drying chamber to remove additional moisture from the viscoelastic glue used to join together the several layers of material.

The flexural strength of laminated structures resulting from embodiments of a method consistent with FIGS. 1 and 2 may comply with the requirements of construction materials. Such standards may be as listed in C 1396/C 1396M-06a, by ASTM-International, incorporated herein by reference in its entirety (hereinafter referred-to as 'ASTM standards'). Furthermore, the flexural strength of the laminated structures resulting from embodiments of a method consistent with FIGS. 1 and 2 may be substantially reduced when the laminated structure is 'scored' with a utility knife or other sharp object.

The desired flexural strength of a laminated structure used for constructing walls, floors, ceilings or doors is dependent upon the situation. For a pristine laminated structure before installation, a high flexural strength is desirable since it allows for easy transportation and handling without structure breakage. Such structures are typically scored and fractured by a tradesman or construction personnel for fitting, during installation (for example, using a utility knife). Thus, when a structure has been scored for installation, in some embodiments it is desirable that the flexural strength of the scored structure have a low value. A low flexural strength value indicates that the scored structure may be easily fractured by hand, without excessive force. Flexural strength may be measured with load bearing edges perpendicular to the panel length (termed 'perpendicular') or with load bearing edges parallel to the panel length (termed 'parallel'). While both parameters are important to the specification of drywall, the flexural strength with load bearing edges perpendicular to the panel length results will only be presented here in the interest of simplicity.

Table 2 shows perpendicular flexural strength results for several examples of drywall materials including typical drywall, laminated panels in current use, and panels fabricated using a method according to embodiments disclosed herein. Panels H1,H2,H, and H4 in Table 2 are four panels fabricated with a method consistent with FIG. 1, having a total thickness of ½ inch. The third column in Table 2 lists an average peak load at fracture, and the fourth column lists a standard deviation in peak load fracture. 'Average' and 'standard deviation' values are obtained for the four different samples considered in each case.

TABLE 2

ASTM C473 flexural strength test results for various wallboard types and conditions

| Series Identification | Sample Description | Average Peak Load a Fracture (lbf) | Standard Deviation |
|---|---|---|---|
| A1-A4 | ⅝ inch thick gypsum panel | 204 | 2.99 |
| B1-B4 | ½ inch thick gypsum panel | 147 | 3.10 |
| C1-C4 | ½ inch thick QuietRock ® 510 laminated gypsum panel | 164 | 4.90 |
| D1-D4 | ½ inch thick laminated gyp panel optimized for fracture | 111 | 8.34 |
| E1-E4 | ⅝ inch thick gypsum panel, scored | 46.3 | 4.65 |
| F1-F4 | ½ inch thick gypsum panel, scored | 15.0 | 0.50 |
| G1-G4 | ½ inch thick QuietRock ® 510 laminated gypsum panel, scored | 84.5 | 3.30 |
| H1-H4 | ½ inch thick laminated gyp panel optimized for fracture, scored | 22.0 | 1.82 |

The flexural strength value of the finished laminate structure 200 (cf. FIG. 2) significantly decreases with the elimination of the paper facings at surfaces 208 and 210. Table 2 illustrates the relationship of two laminate embodiments and typical gypsum wallboard materials. As seen in Table 2, the currently available laminated panels (QuietRock® 510) have an average flexural strength of 164 pounds force when pristine (series C1-C4). Laminated structures fabricated according to a method consistent with embodiments disclosed herein (represented by series identification D1-D4) show a pristine flexural strength of 111 pounds force (111 lbf). In comparison typical prior art ⅝ inch thick and ½ inches thick gypsum sheets (A1-A4 and B1-B4 respectively), have an average flexural strength of 204 and 147 pounds force in their pristine state. All of these material types pass the flexural strength requirements of the applicable ASTM test method (cf. the ASTM standards).

The flexural strength of drywall materials when scored is also presented in Table 2. The currently available laminated panels (QuietRock® 510) have an average flexural strength of 84.5 pounds force when scored (series G1-G4). In comparison, scored typical prior art gypsum sheets, have an average flexural strength of 15 pounds force for ½ inch thick (F1-F4) and 46.3 pounds force for ⅝ inch thick (E1-E4) respectively. The values establish that some prior art panels can be scored and fractured in the standard manner used in construction (cf. E1-E4, & F1-F4, Table 2), but lack the acoustic properties of the structures described herein (cf. H1-H4, Table 2). Typically, structures having flexural strength greater than fifty pounds force (50 lbf) are not capable of being fractured by hand. Thus, installation of such structures may require the use of additional machinery and complex procedures at the point of installation.

QuietRock® 510 (G1-G4) has improved sound attenuation properties but can not be scored and fractured using traditional scoring and breaking methods (e.g. by hand). Laminated structures fabricated according to a method consistent with embodiments disclosed herein (represented by series identification H1-H4) show a scored flexural strength of 22 pounds force (22 lbf) as shown in Table 2 and thus can be scored and fractured in the standard manner used in construction while at the same time providing an enhanced acoustical attenuation of sound. For example, in some embodiments such as H1-H4, a laminated structure may be fractured by hand.

Embodiments of laminated structures fabricated using a method consistent with FIG. 1, such as H1-H4 in Table 2, may still have a strong flexural strength when in pristine condition. That is, prior to scoring, the laminated structure may still comply with the requirements of construction standards as the C 1396/C 1396M-06 standard. For example, structures as H1-H4 in Table 2 have a 'pristine' or non-scored flexural strength higher than the 107 pounds force (107 lbf) required by Method B, perpendicular direction, in the ASTM C 1396/C 1396M-06a standard (cf. ASTM standards).

Figure 7:
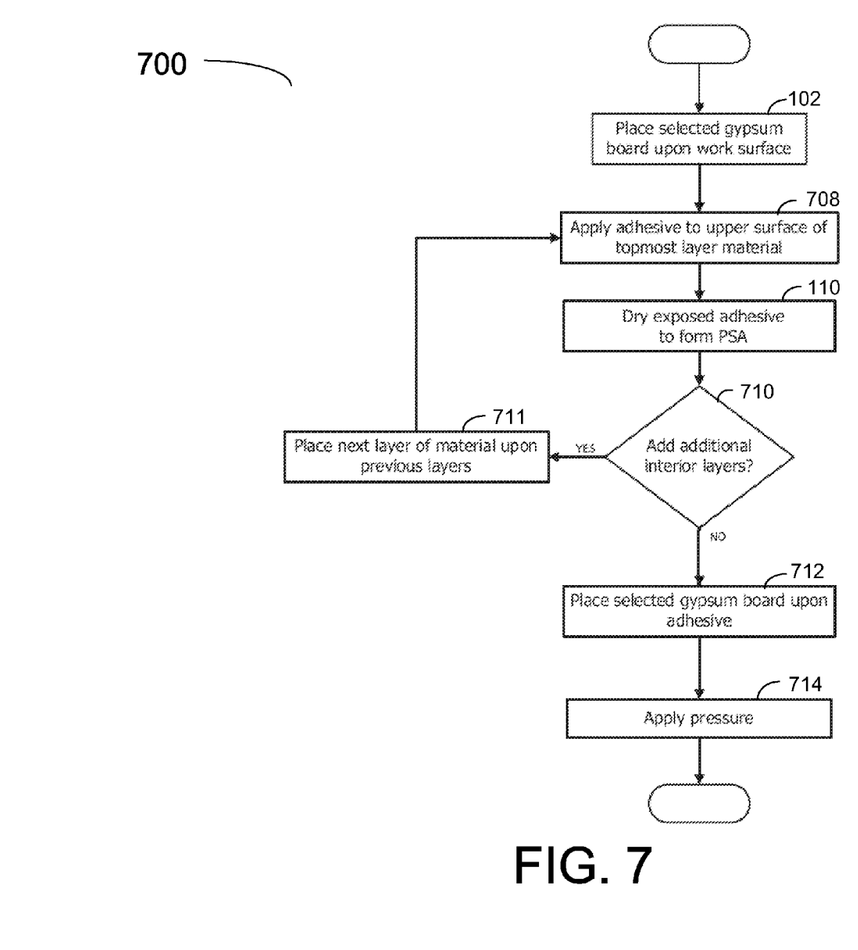
FIG. 7 shows an example of a process sequence in accordance with some embodiments disclosed herein.

Referring to FIG. 7, an example of method 700 according to some embodiments is presented. In some embodiments of method 700, laminated structures may be consistent with FIGS. 4 and 5, above. Reference to top and bottom layers may be understood in the context of FIGS. 4 and 5 independently of any orientation in the use of the structure or alternative assembly orientations. A bottom gypsum board of a selected thickness (e.g. 406 in FIG. 4) is placed upon a work surface in step 102. Step 102 in method 700 is as described in detail with respect to FIGS. 1 and 4 above. In some embodiments the work surface may be as described in detail with respect to element 408 in FIG. 4, above. An adhesive is applied to the upper surface of the bottom gypsum board in step 708. In some embodiments, step 708 in method 700 may be as step 108, described in detail with respect to FIGS. 1 and 4, above. The adhesive used in step 708 may be as adhesive 404, described in detail with respect to FIG. 4.

Next, the adhesive is dried at step 110, so that the resulting moisture content in the adhesive is no greater than five percent by weight. Drying step 110 in method 700 is as described in detail above with respect to FIGS. 1, 4, and 5. A variety of methods may be used to dry the adhesive in step 110, as discussed above in relation to FIG. 1.

One parameter in step 110 is the degree of dryness of the adhesive attained in transforming the viscoelastic adhesive into a PSA. For a specific implementation according to method 700, the combination of drying time, temperature and humidity of the drying environment and the thickness of the adhesive layer are adjusted to provide a suitable moisture content in transforming the adhesive into a PSA. For example, some embodiments of method 700 may reach five percent moisture by weight as measured with a moisture sensor such as described above. Assuming these factors are reasonably constant, the predetermined drying time is used for drying step 110. In some embodiments, care may be taken that the adhesive is not completely dry (0% moisture content). If the adhesive is completely dried the next material in the sandwich may not stick to it. A moisture content of approximately five percent provides a tacky adhesive that has good adhesion characteristics but does not require further drying after the sandwich is assembled. In some embodiments consistent with method 700, a moisture content of less than 5% may be used in drying step 110.

In some embodiments such as illustrated in FIG. 5 above, there may be additional layers of material 504 between the two outer panels of, for example, gypsum board 402, and 406. Examples include vinyl, sheet metal, plywood, and gypsum, as discussed more expansively in aforementioned U.S. Pat. No. 7,181,891. Step 710 provides an option to include such additional materials 504 in the sandwich. If such an option is selected, additional material 504 is placed upon the sandwich of layers resulting after drying step 110 (e.g. element 410 upon the exposed PSA 404, as in FIG. 4), then adhesive 502 is applied to the exposed surface of the newly placed material 504 at step 708. Adhesive 502 is dried to form a PSA at step 110. An option for an additional layer is considered at step 710. If no more material layers 504 are to be added, the process continues with step 712 wherein a top gypsum board is placed upon PSA 502 to complete the sandwich. Step 712 may be as step 112, described in detail with respect to FIG. 1, above. In some embodiments, the top gypsum board used in step 712 may be as board 402 in FIGS. 4 and 5.

The fully-assembled laminated structure is pressed together at step 714. Step 714 in method 700 may be as step 114 in method 100, described in detail in relation to FIGS. 1, 4, and 5 above.

In some embodiments of method 700, the resulting laminated structure may be as structure 400 described in FIG. 4, or structure 500 described in FIG. 5. Further embodiments of method 700 may use a bottom gypsum board and a top gypsum board as regular type gypsum wallboards. Regular type gypsum wallboards may be as described above, having a gypsum or gypsum-and-fiber enhanced composite core surrounded by a layer of paper, bonded to the core. Some embodiments of method 700 may use a combination of a gypsum layer resulting from bisection step 104 (cf. FIG. 1), and a regular type gypsum layer surrounded by a layer of paper bonded to the core, for either the top or bottom gypsum layers. Further embodiments may use either a bisected gypsum layer or a paper-covered gypsum layer in the top and bottom gypsum boards.

The foregoing description of some embodiments of the invention has been presented for the purposes of illustration and description. The description is not intended to be exhaustive or to limit the invention to the precise forms disclosed. Many modifications and variations will be apparent to one skilled in the relevant art.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

Unless expressly stated otherwise herein, ordinary terms have their corresponding ordinary meanings within the respective contexts of their presentations, and ordinary terms of art have their corresponding regular meanings.

What is claimed is:

1. A method of forming a laminated structure appropriate for use in constructing walls, floor, ceilings or doors, said method comprising:
    providing a first layer of gypsum wallboard material having a first surface and a second surface;
    applying a layer of viscoelastic glue that includes as a component a single acrylic polymer to said first surface;
    exposing said glue to a drying environment for a predetermined time to remove a selected amount of moisture from said glue; and
    placing a second layer of gypsum wallboard material onto the layer of glue, thereby joining said first layer to said second layer;
    wherein the predetermined time the glue is exposed to the drying environment is sufficient to remove the selected amount of moisture from said glue until less than 5% moisture remains.

2. The method of claim 1 wherein said first layer of material and said second layer of material form external layers of said laminated structure.

3. The method of claim 2, further including applying pressure to the laminated structure following the placing of said second layer on said glue.

4. The method of claim 1, further including bisecting a single sheet of gypsum wallboard to form said first and second layers of gypsum wallboard.

5. The method of claim 1 including:
    applying a second layer of viscoelastic glue to an exposed surface of said second layer; and
    exposing said second layer of viscoelastic glue to a drying environment for a predetermined time to remove a selected amount of moisture from said glue.

6. The method of claim 5 including:
    placing a third layer of material on said second layer of viscoelastic glue after drying said second layer of viscoelastic glue for said predetermined time thereby to create said laminated structure;
    wherein the predetermined time the glue is exposed to the drying environment is sufficient to remove the selected amount of moisture from said glue until approximately 5% moisture remains.

7. The method of claim 6 including applying a selected pressure to said laminated structure following the placing of said third layer of material on said second layer of viscoelastic glue.

8. A method of forming a laminated panel, said method comprising:
    placing a viscoelastic glue that includes as a component a single acrylic polymer in a selected pattern on an exposed surface of a first layer of gypsum wallboard material to which a second layer of gypsum wallboard material is to be bonded;
    exposing said viscoelastic glue to a drying environment to remove moisture from said glue; and
    placing said second layer of gypsum wallboard material over said viscoelastic glue following exposing said viscoelastic glue to the drying environment;
    wherein the selected amount of moisture removed is sufficient to leave less than 5% of the moisture remaining.

9. The method of claim 8 wherein said viscoelastic glue is placed on said exposed surface in a selected pattern so as to cover less than all of said exposed surface.

10. The method of claim 8 wherein said viscoelastic glue is placed on said exposed surface as a continuous layer.

11. The method of claim 9 wherein said viscoelastic glue has a thickness between one thirty second of an inch (1/32") and one eighth of an inch (1/8").

12. The method of claim 9 wherein said drying environment is air.

13. The method of claim 12 wherein said air is at approximately ambient temperature.

14. The method of claim 13 wherein air is forced across said viscoelastic glue at a flow rate between about ten thousand cubic feet per minute and about fifty thousand cubic feet per minute.

15. The method of claim 9 wherein said selected pattern comprises one or more patterns selected from a group of patterns consisting of circles, squares, rectangles, triangles, stripes, polygons, random shapes, and semicircles.

16. The method of claim 8 wherein said first layer of material is a first layer of gypsum wall board with no paper or other coating on what will be an internal surface of said first layer when said first layer is part of said laminated panel.

17. The method of claim 16 wherein said second layer of material is a second layer of gypsum wall board with no paper or other coating on what will be an internal surface of said second layer when said second layer is part of said laminated panel.

18. The method of claim 1 wherein said first external layer of material comprises a portion of a faced gypsum wallboard, said portion being cut in a plane parallel to the front and back surfaces of the wallboard such that said portion has a thickness less than the thickness of said wallboard and retains the normal wallboard facing material on what will be the external surface of said laminated structure and has the interior wallboard material exposed on what will be the surface of said portion parallel to said external surface and internal to said laminated structure.

19. The method of claim 18 wherein the gypsum wallboard is faced with paper or fiberglass mat.

20. The method of claim 19 wherein said viscoelastic glue is applied to all of said first surface.

\* \* \* \* \*